(12) United States Patent
Carlough et al.

(10) Patent No.: US 7,519,649 B2
(45) Date of Patent: Apr. 14, 2009

(54) SYSTEM AND METHOD FOR PERFORMING DECIMAL DIVISION

(75) Inventors: Steven R. Carlough, Poughkeepsie, NY (US); Paulomi Kadakia, Bridgeville, PA (US); Wen H. Li, Poughkeepsie, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 11/055,221

(22) Filed: Feb. 10, 2005

(65) Prior Publication Data

US 2006/0179102 A1    Aug. 10, 2006

(51) Int. Cl.
G06F 7/496    (2006.01)
(52) U.S. Cl. .................................... 708/651
(58) Field of Classification Search ............... 708/651
See application file for complete search history.

(56) References Cited

U.S. PATENT DOCUMENTS

| | | | |
|---|---|---|---|
| 3,591,786 | A | 7/1971 | Nelson |
| 3,735,108 | A | 5/1973 | Bolt et al. |
| 4,603,397 | A | 7/1986 | Ohtsuki et al. |
| 4,635,220 | A | 1/1987 | Yabe et al. |
| 4,692,891 | A | 9/1987 | Yamaoka et al. |
| 4,817,048 | A | 3/1989 | Rawlinson et al. |
| 4,992,968 | A | 2/1991 | Adiletta |
| 5,001,664 | A | 3/1991 | Makita et al. |
| 5,587,940 | A | 12/1996 | Ferguson et al. |
| 6,173,305 | B1 * | 1/2001 | Poland ...................... 708/650 |
| 6,751,645 | B1 * | 6/2004 | Gorshtein et al. ........... 708/650 |
| 2001/0025293 | A1 * | 9/2001 | Inui ........................... 708/650 |
| 2004/0230634 | A1 | 11/2004 | Busaba et al. |

\* cited by examiner

*Primary Examiner*—David H Malzahn
(74) *Attorney, Agent, or Firm*—Cantor Colburn LLP; Lynn Augspurger

(57) ABSTRACT

A method for performing decimal division including receiving a scaled divisor and dividend and storing a subset of the multiples of the scaled divisor. An accumulated quotient is initialized to be equal to zero, a first current remainder is initialized to be equal to the scaled dividend, and a second current remainder is initialized to be equal to the scaled dividend minus the scaled divisor. The following loop is performed until a selected number of quotient digits are produced. An estimated next quotient digit is calculated based on the first digit of the first current remainder. A temp remainder is selected to be either the first current remainder or the second current remainder based on the estimated next quotient digit. A first next remainder is calculated by subtracting one of the stored multiples from the temp remainder, where the stored multiple is selected based on a first digit of the first current remainder. A second next remainder is calculated by subtracting an other one of the stored multiples from the temp remainder, where the other one of the stored multiples is selected based on the first current remainder. An actual quotient digits is calculated based on the estimated next quotient digit, the first current remainder and the first next remainder. The accumulated quotient is updated with the actual next quotient digit. Finally, the first current remainder is set to be equal to the first next remainder and the second current remainder is set to be equal to the second next remainder.

9 Claims, 4 Drawing Sheets

| remainder | | iterA | | | iterB | | |
|---|---|---|---|---|---|---|---|
| | R - q | | *D is calculated for iteration A | | | | |
| | R - (q +/-1) | | *D is calculated for iteration B | | | | |
| R | binary | q =qh ql | | q+1 | | | |
| 0 | 00000 | 0 0 0 | | +1 | | | |
| 1 | 00001 | 1 0 1 | | +2 | | | |
| 2 | 00010 | 2 0 2 | | +3 | | | |
| 3 | 00011 | 3 0 3 | | +4 | | | |
| 4 | 00100 | 4 0 4 | | +5 | | R(5:8) | |
| 5 | 00101 | 5 1 –5 | | -4 | | <.5 | >.5 |
| 6 | 00110 | 6 1 -4 | | | | -5 | -3 |
| 7 | 00111 | 7 1 –3 | | | | -4 | -2 |
| 8 | 01000 | 8 1 –2 | | | | -3 | -1 |
| 9 | 01001 | 9 1 –1 | | | | -2 | 0 |
| -0 | 11001 | 0 0 0 | | -1 | | | |
| -1 | 11000 | -1 0 –1 | | -2 | | | |
| -2 | 10111 | -2 0 –2 | | -3 | | | |
| -3 | 10110 | -3 0 –3 | | -4 | | | |
| -4 | 10101 | -4 0 –4 | | -5 | | R(5:8) | |
| -5 | 10100 | -5 -1 5 | | 4 | | <.5 | >.5 |
| -6 | 10011 | -6 -1 4 | | | | 5 | 3 |
| -7 | 10010 | -7 -1 3 | | | | 4 | 2 |
| -8 | 10001 | -8 -1 2 | | | | 3 | 1 |
| -9 | 10000 | -9 -1 1 | | | | 2 | 0 |

FIGURE 2 converting the quotient digit on the fly requires
holding a quotient around until its remainder is calculated

```
Sign q            Sign R           |   Quot
--------------------------------------+----------------
   +                 +              |   q
   +                 -              |   q - 1
   -                 +              |   q' + 1
   -                 -              |   q'
```

FIGURE 3

| 1 | 2 | 3 | 4 | 5 | 6 | 7 | 8 |
|---|---|---|---|---|---|---|---|
| Qsel | R - qD | R- qD | Qsel | R - qD | R – qD | Qsel | R – qD |
|  |  | R- q"D | R- q"D |  | R- q"D | R- q"D |  | where q" is q +/- 1

FIGURE 4

SYSTEM AND METHOD FOR PERFORMING DECIMAL DIVISION

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

This invention relates generally to decimal division, and more particularly, to the decimal division on two decimal operands in binary coded decimal (BCD) format.

In the past, a simple method for performing long division by a programmed computer subtracted a divisor from a dividend until the result of the subtraction operation was a negative value. The number of subtractions minus one yields the quotient. The remainder of the division was determined by adding the divisor to the negative result.

Alternatively, the divisor is repeatedly subtracted from a portion of the dividend comprising a like number of leading digits of the dividend. If the first subtraction is negative, the division is subtracted from a like number of leading dividend digits plus one. Otherwise, once the result of the subtraction is negative, no further subtractions are performed and the divisor is added to the negative result to attain the remainder. The number of subtractions minus one comprises a first digit of the quotient. The process is repeated with the divisor being subtracted from the remainder, and modified by appending additional digits from the original dividend to equal the number of divisor digits. The number of such subtractions minus one is appended as a next digit of the quotient. This improved method for determining the quotient of a division operation is still time consuming due to the large number of subtraction operations that must be performed when dividing a large dividend by a relatively small divisor.

Another method is referred to as a non-restoring division algorithm. The non-restoring division algorithm creates stored multiplies and performs repetitive subtraction to calculate a quotient. Generally, there are four parts to performing a non-restoring division algorithm: 1) quotient selection; 2) divisor multiple creation; 3) subtracting divisor multiples from the previous remainder to form the new remainder; and 4) quotient accumulation. For decimal division, the size of the quotient logic for a typical non-restoring division algorithm can get very large, and the logic may be too large to be implemented within performance and space requirements. It would be desirable to be able to perform non-restoring decimal division in a more efficient manner.

BRIEF SUMMARY OF THE INVENTION

Exemplary embodiments of the present invention include a method for performing decimal division. The method includes receiving a scaled divisor and dividend and storing a subset of the multiples of the scaled divisor. An accumulated quotient is initialized to be equal to zero, a first current remainder is initialized to be equal to the scaled dividend, and a second current remainder is initialized to be equal to the scaled dividend minus the scaled divisor. The following loop is performed until a selected number of quotient digits are produced. An estimated next quotient digit is calculated based on the first digit of the first current remainder. A temp remainder is selected to be either the first current remainder or the second current remainder based on the estimated next quotient digit. A first next remainder is calculated by subtracting one of the stored multiples from the temp remainder, where the stored multiple is selected based on a first digit of the first current remainder. A second next remainder is calculated by subtracting an other one of the stored multiples from the temp remainder, where the other one of the stored multiples is selected based on the first digit and second digit of the first current remainder. An actual quotient digit is calculated based on the estimated next quotient digit, the first current remainder and the first next remainder. The accumulated quotient is updated with the actual next quotient digit. Finally, the first current remainder is set to be equal to the first next remainder and the second current remainder is set to be equal to the second next remainder.

Additional exemplary embodiments include a system for performing decimal division. The system includes input registers for storing a scaled divisor and a scaled dividend, a two cycle adder, and a plurality of multiples registers for storing a subset of the multiples of the scaled divisor. The system also includes a pipeline mechanism for calculating quotient digits in response to the scaled divisor and the scaled dividend, where each quotient digit is calculated in three clock cycles. The calculating includes selecting a new quotient digit and calculating a new remainder using the two cycle adder. Input to the two cycle adder includes data from one or more of the multiples of the scaled divisor registers.

Further exemplary embodiments include a system for performing decimal division. The system includes input registers for storing a scaled divisor and a scaled dividend, a two cycle adder, and a plurality of multiples registers for storing a subset of the multiples of the scaled divisor. The system also includes a mechanism for receiving the scaled divisor and dividend into the input register and storing a subset of the multiples of the scaled divisor in the multiples registers. An accumulated quotient is initialized to be equal to zero, a first current remainder is initialized to be equal to the scaled dividend, and a second current remainder is initialized to be equal to the scaled dividend minus the scaled divisor. The following loop is performed until a selected number of quotient digits are produced. An estimated next quotient digit is calculated based on the first digit of the first current remainder. A temp remainder is selected to be either the first current remainder or the second current remainder based on the estimated next quotient digit. A first next remainder is calculated using the two cycle adder by subtracting one of the stored multiples from the temp remainder, where the stored multiple is selected based on a first digit of the first current remainder. A second next remainder is calculated using the two cycle adder by subtracting an other one of the stored multiples from the temp remainder, where the other one of the stored multiples is selected based on the first and second digits of the first current remainder. An actual quotient digit is calculated based on the estimated next quotient digit, the first current remainder and the first next remainder. The accumulated quotient is updated with the actual next quotient digit. Finally, the first current remainder is set to be equal to the first next remainder and the second current remainder is set to be equal to the second next remainder.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a table that is utilized by exemplary embodiments of the present invention for calculating quotient digits;

FIG. 3 is a table that is utilized by exemplary embodiments of the present invention to select a quotient digit;

FIG. 4 depicts the decimal division being pipelined according to exemplary embodiments of the present invention.

The detailed description explains the preferred embodiments of the invention, together with advantages and features, by way of example with reference to the drawings.

DETAILED DESCRIPTION OF THE PREFERRED EMBODIMENTS

Exemplary embodiments of the present invention include a decimal divide algorithm that combines some well known programs for binary with some new ideas for decimal to create a high speed implementation. Previous implementations created stored multiple and performed repetitive subtraction to calculate a quotient. As described above, there are four parts to performing a non-restoring division algorithm: 1) quotient selection; 2) divisor multiple creation; 3) subtracting divisor multiples from the previous remainder to form the new remainder; and 4) quotient accumulation. Exemplary embodiments of the present invention utilize a well known technique to reduce the quotient selection, but reduce the hardware area for creating divisor multiples. In addition exemplary embodiments of the present invention utilize an innovative technique for on the fly correction of the accumulated quotient.

There are a couple of well known techniques for quotient selection. The selected quotient estimate is a function of the partial remainder and divisor, and in exemplary embodiments of the present invention is from the set {−9, −8, −7, −6, −5, −4, −3, −2, −1, 0, +1, +2, +3, +4, +5, +6, +7, +8, +9}. The look-up table required for a straightforward implementation is too big for most processors to implement. Exemplary embodiments of the present invention utilize a technique called pre-scaling. The table size to pre-scale the divisor and the dividend is much smaller. In a pre-scaled division, the divisor and dividend are scaled by an approximation to "1/divisor." With a two digit index and a two digit pre-scale it is possible to scale the divisor to greater than or equal to 1.0 and less than 1.1 (i.e., 1.0<=divisor <1.1). When the divisor is restricted to this range, the quotient is approximately equal to the most significant digit of the partial remainder. Thus, the quotient selection logic is very simple and fast, and does not require a separate lookup table. The most significant digit of the partial remainder becomes the quotient selection for the next iteration.

Exemplary embodiments of the present invention reduce the number of multiples of the divisor that have to be stored or created. A recoding technique, similar to Booth Recoding for radix 2 is utilized to recode the radix 10 quotient. This new use of the recoding technique only requires multiples from 0 to 5 to be stored, rather than all multiples from 0 to 9 being stored. Also, the quotient accumulation technique allows for maintaining an exactly truncated quotient.

Figure 1:
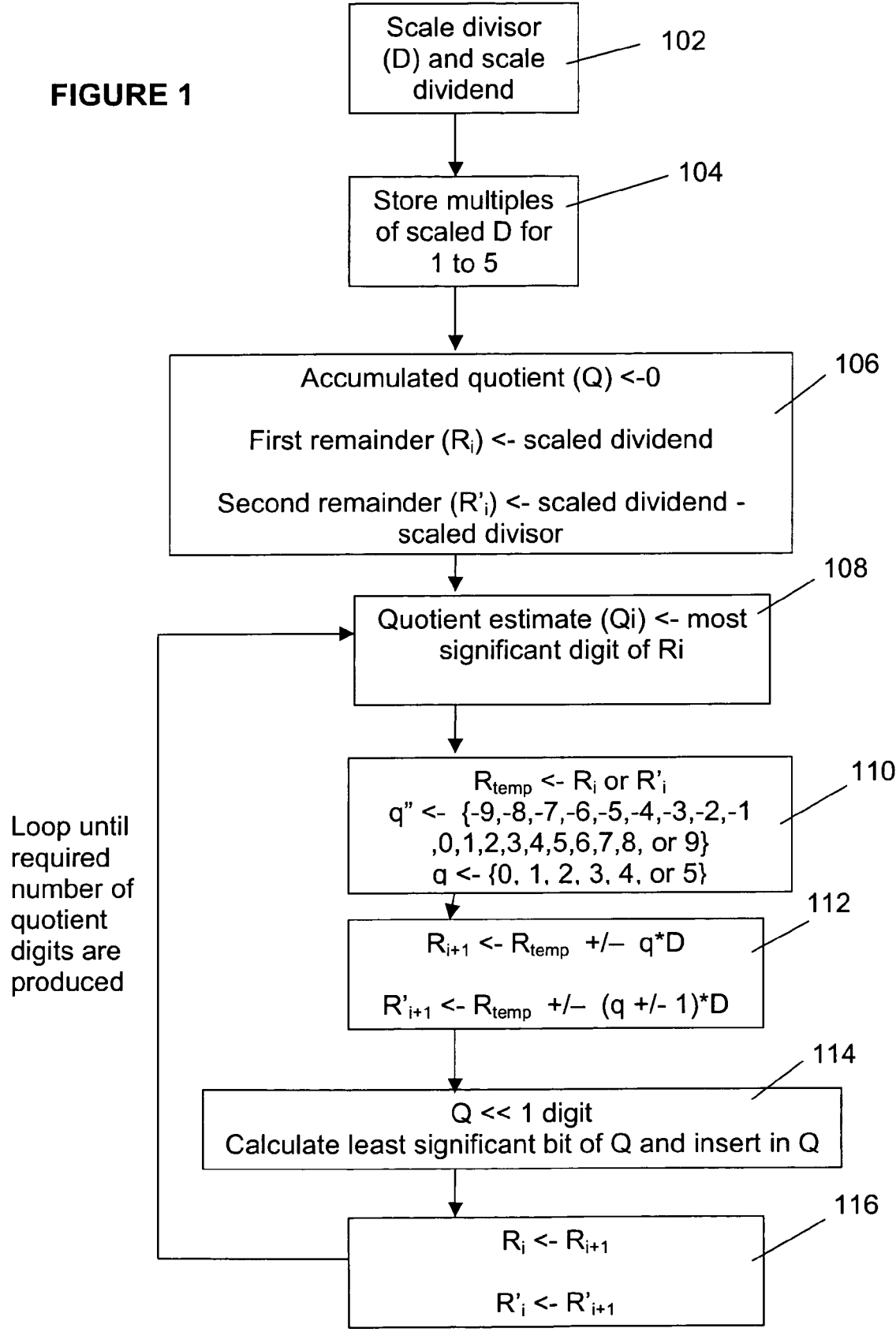
FIG. 1 is a flow diagram of a decimal division process that is utilized by exemplary embodiments of the present invention.

FIG. 1 is a flow diagram of a decimal division process that is utilized by exemplary embodiments of the present invention to perform the equation: quotient (Q)=dividend (N)/divisor (D). At step 102, the divisor (D) is scaled by utilizing a lookup table to find a value "T" which is an approximation to "1/D." In exemplary embodiments of the present invention, the lookup table is indexed by the first two digits of D. The result is that T*D is within the following limits: 1.0<=T*D<1.1. In addition, at step 102, the dividend (N) is also pre-scaled by T (i.e., N<−T*N). At step 104, multiples of the pre-scaled divisor are stored. The multiples stored include 1D, 2D, 3D, 4D, and 5D. For negative multiples an addition is performed rather than a subtraction. At step 106 in FIG. 1, the first remainder (Ri) (also referred to herein as a first current remainder) is set to the value of the pre-scaled dividend. Also at step 106 in FIG. 1, the second remainder (R'i) (also referred to herein as the second current remainder) is set to the value of the pre-scaled dividend minus the pre-scaled divisor.

At step 108 in FIG. 1, the estimate of the value of the first digit of the quotient (Qi) (also referred to herein as the estimated next quotient digit) is set to the most significant digit of the first remainder (Ri). Based on the value of Qi and the table depicted in FIG. 2, and described below, the remainder and multiple are chosen for calculating the next remainders at step 110. That is, Rtemp (also referred to herein as a temporary remainder) is set to either Ri or R'i and q is set to 0,1,2,3,4, or 5. At step 112, the first next remainder Ri+1 is calculated as Ri−q*D, where q*D is equal to one of the stored multiples. Also at step 112, the second next remainder R'i+1 is calculated as Ri−(q+/−1)*D, where (q+/−1)*D is equal to one of the stored multiples. There is some complexity in figuring out whether to use +1 or −1. The table depicted in FIG. 2 and described below is utilized in determining whether to utilize q+1 or q−1 to calculate R'i+1 depending on Ri's value and sign.

At step 114, the value of the truncated quotient digit (also referred to herein as the actual next quotient digit) is calculated based on the sign of Qi and the sign of Ri+1. FIG. 3, described below, depicts how to calculate the truncated quotient digit. The accumulated quotient (Q) is then shifted left one digit, and the truncated quotient digit is inserted into the least significant digit of the accumulated quotient. At step 116, the current remainders are set to be equal to the next remainders. That is, Ri<−Ri+1 and R'i<−R'i+1. Processing then continues at step 108. This loop, from step 108 to step 116 is continued until the required number of quotient digits are produced. The required number of quotient digits may be pre-selected and/or based on the number of bits available to store the quotient.

FIG. 2 is a table that is utilized by exemplary embodiments of the present invention for calculating quotient digits. The most significant digit of the i-th iteration's remainder is used to select the quotient as shown in the table in FIG. 2. The first column (labeled R) shows the remainder in decimal signed format, the second column (labeled binary) shows the binary representation of this decimal signed digit. The third column (labeled q) shows the quotient selection that is used in step 108 in FIG. 1 to calculate $R_{i+1}$. Note that this decimal digit is recoded into a digit set containing {−5, −4, −3, −2, −1, 0, +1, +2, +3, +4, +5}. Thus the next two columns (labeled qh and ql) show a two digit representation of the quotient in this recoded format. The first digit is weighted by ten and the second digit is weighted by one. If the first digit is 0 then $R_{temp}$ is equal to $R_i$ otherwise it is equal to $R'_i$.

An example, is that +9 is now represented by the pair (+1, −1), where the +1 in the first digit represents +10 and the −1 in the second digit represents −1. The sum of +10 and −1 is +9. Iteration A calculates the first remainder, $R_{i+1}$, to be equal to $(R_i-Q_iD)$, and iteration B calculates the second remainder, $R'_{i+1}$, to be equal to $(R_i-(Q_i+1)D)$. To apply a quotient estimate of +9, the result of iteration B from the previous iteration (i.e., $R'_i$) would be chosen since it applied Q+1 as designated by the "1" in the qh column corresponding to the "+9" row. A quotient estimate of −1 would be chosen and the multiple of −1*D would be subtracted from $R'_i$. Note that Q+1 in a prior iteration appears as Q+10 in the current iteration since the iterations are weighted by a different power of ten. Choosing a Q+1 in a prior iteration and Q=−1 in the current iteration is equivalent to subtracting 9*D from R. In exemplary embodiments of the present invention, the multiples between six and nine times D are not needed and do not need to be calculated or stored.

Column six (labeled iteration B) shows which quotient should be selected for R' calculation. The quotient will be either plus or minus one from the quotient selected for iteration A. When the remainder from the i-th iteration is between six and nine, or between minus six and minus nine, more bits of the remainder need to be examined. The next digit of the remainder needs to be examined to see if it is less than five or greater than or equal to five. Thus, two digits of the remainder need to be examined, though only one digit is-examined in the critical path of iteration A to create R and two digits are examined in iteration B to create R'.

FIG. 3 is a table that is utilized by exemplary embodiments of the present invention to select a truncated quotient digit. A truncated quotient is produced even though the non-restoring algorithm produces a rounded quotient in the recoded digit set. By examining the sign of the estimated quotient digit to be accumulated and the sign of the remainder, the truncated quotient can be determined from four possibilities: q, q−1, q', or q'+1, where q' represents the 9's complement (or 9−q). The table in FIG. 3 shows the proper choice. An example follows:

| Calculated Quotient | 1 | 0 | 1 | −0 | −6 | 2 | 2 | −0 | −7 | 3 |
|---|---|---|---|---|---|---|---|---|---|---|
| Quotient Sign | + | + | + | − | − | + | + | − | − | + |
| Remainder Sign | + | + | − | − | + | + | − | − | + | + |
| Choose | q | q | q−1 | q' | q'+1 | q | q−1 | q' | q'+1 | q |
| Truncated Quotient | 1 | 0 | 0 | 9 | 4 | 2 | 1 | 9 | 3 | 3 |

Exemplary embodiments of the present invention utilize this unique method for on the fly correction of the quotient for decimal format where the digits range from +9 to −9.

FIG. 4 depicts the decimal division being pipelined according to exemplary embodiments of the present invention. The addition of BCD formatted data can be relatively slow, and decimal floating point operands are typically sixteen or thirty-four digits. Exemplary embodiments of the present invention assume that an addition requires two cycles which can be pipelined every cycle. Thus, the latency to complete an add operation is two cycles, but a new add may be started every cycle. In this type of implementation, exemplary embodiments of the present invention perform one iteration every three cycles which produces one digit as shown in FIG. 4.

Qsel, in FIG. 4, represents the quotient selection and multiplexing of the correct multiple of the divisor. After the multiple of the divisor is selected, the adder performs iteration A at step 108 in FIG. 1, which computes $R_{i+1}=R-q*D$. In the interleaved adder cycles, iteration B is performed at step 108 in FIG. 1 to compute $R'_{i+1}=R-(q\pm1)*D$ to reduce the multiples needed. Note that the result of iteration A ($R_{i+1}$) or iteration B ($R'_{i+1}$) is selected to go back into the next R−q*D calculation.

Figure 5:
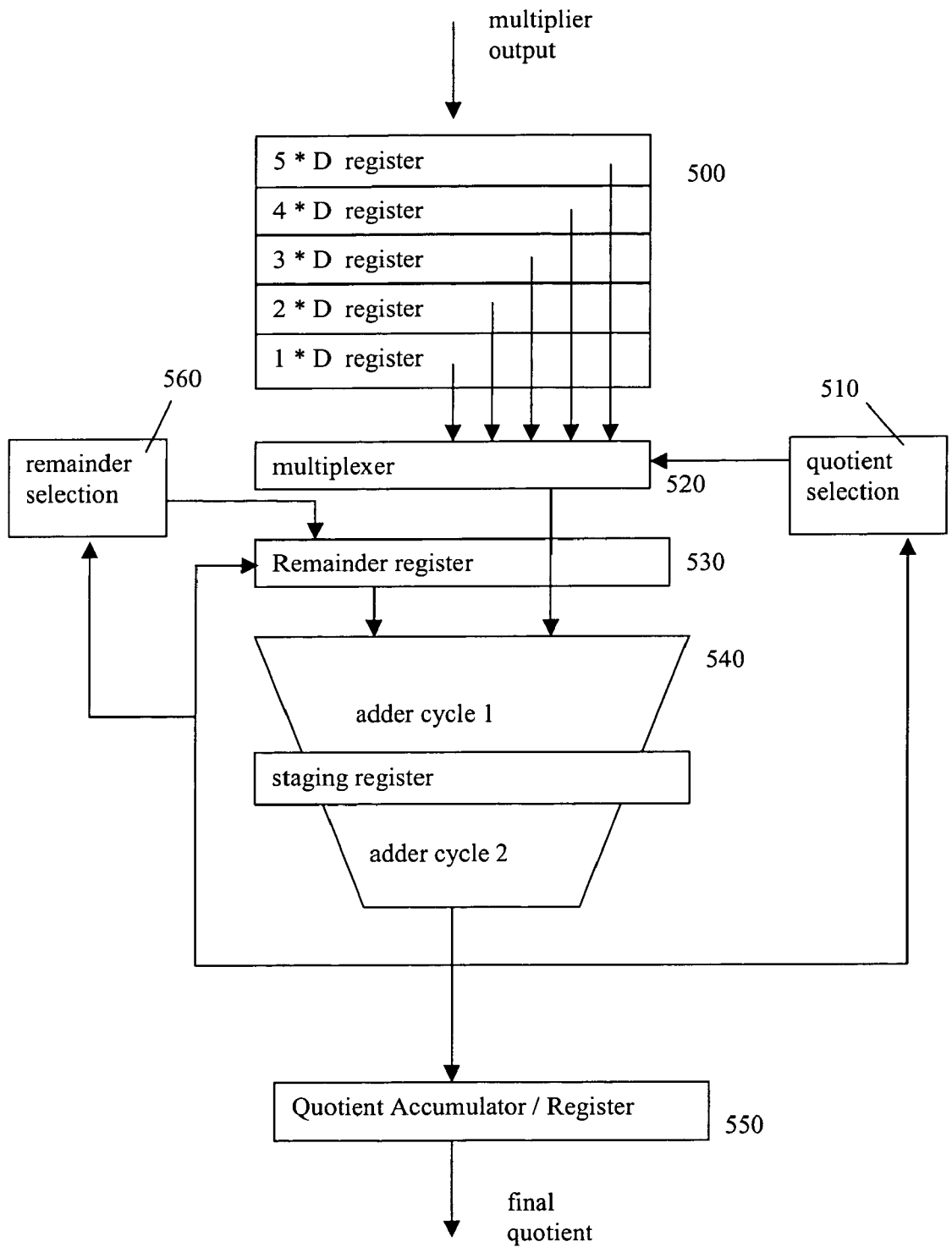
FIG. 5 is a block diagram of circuitry that may be utilized by exemplary embodiments of the present invention to perform decimal division.

FIG. 5 is a block diagram of circuitry that may be utilized by exemplary embodiments of the present invention to perform decimal division in response to a divisor and a dividend. FIG. 5 includes multiples registers 500, a quotient selection block 510, a multiplexer 520, a remainder register 530, a two cycle adder 540, a quotient accumulator 550, and a remainder selection box 560. In an exemplary embodiment of the present invention, the multiples registers 500 stores five multiples (1, 2, 3, 4, and 5) of the divisor. The quotient selection block 510 selects a new quotient digit based on the data in the remainder register and the quotient selection block 510 selects which of the multiples will be input to the two cycle adder 540 based on an estimate of the next quotient digit. Step 108 in FIG. 1 corresponds to the processing performed in the two cycle adder 540 with input coming from the remainder register 530 and the multiples registers 500. Steps 110 and 114 in FIG. 1 are performed by the quotient selection block 510. The quotient accumulator 550 receives the output from step 112 in FIG. 1 and once the required number of quotient digits are produced, the quotient accumulator 550 contains the final quotient. The remainder selection box 560 selects between R and R' for calculating the next remainder.

The present invention is novel in that it has reduced the decimal division iteration to only 3 cycles in a design where an addition requires 2 cycles. Other advantages of the present invention are that only the multiples of divisor between 1 and 5 times need be stored to accelerate the operation. The multiples are reduced without any addition delay by computing a second remainder in unused pipeline stages of the adder. Also a method for producing a truncated quotient on the fly even though the quotient digit set of between +9 and −9 is used is shown. The present invention has a startup penalty to scale divisor to between 1.0 and 1.1 but this delay is overcome by a very fast iteration of only 3 cycles per quotient digit produced. The only additional hardware needed for this division algorithm over hardware needed for addition and multiplication is the quotient selection tables, the prescale tables, quotient accumulation digit correction hardware, and control circuits to choose the remainder.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for performing decimal division, the system comprising:
   input registers for storing a scaled divisor and a scaled dividend;
   a plurality of multiples registers for storing a subset of multiples of the scaled divisor; and
   a pipeline mechanism including a two cycle adder, a latching multiplexer connected to the multiples registers and the two cycle adder, a remainder register connected to the two cycle adder, remainder selection circuitry connected to the remainder register, quotient selection circuitry connected to the multiplexer, the remainder selection circuitry and the remainder register, and a quotient accumulator connected to the two cycle adder, the pipeline mechanism calculating quotient digits in response to the scaled divisor and the scaled dividend, wherein each quotient digit is calculated in three clock cycles and the calculating includes:
   selecting a new quotient digit; and
   calculating a new remainder using the two cycle adder, wherein input to the two cycle adder includes data from one or more of the multiples registers.

2. A system for performing decimal division, the system comprising:
   input registers for storing a scaled divisor and a scaled dividend;
   a plurality of multiples registers for storing a subset of the multiples of the scaled divisor; and
   a mechanism including a two cycle adder, a latching multiplexer connected to the multiples registers and the two cycle adder, a remainder register connected to the two cycle adder, remainder selection circuitry connected to the remainder register, quotient selection circuitry connected to the multiplexer, the remainder selection circuitry and the remainder register, and a quotient accumulator connected to the two cycle adder, the mechanism:
   receiving the scaled divisor and dividend into the input registers;
   storing a subset of the multiples of the scaled divisor in the multiples registers;
   initializing an accumulated quotient to zero;
   initializing a first current remainder to be equal to the scaled dividend;
   initializing a second current remainder to be equal to the scaled dividend minus the scaled divisor; and
   performing until a selected number of quotient digits are produced:
      calculating an estimated next quotient digit based on the first digit of the first current remainder;
      selecting a temporary remainder to be either the first current remainder or the second current remainder based on the estimated next quotient digit;
      calculating a first next remainder by subtracting one of the stored multiples from the temporary remainder using the two cycle adder, wherein the stored multiple is selected based on a first digit of the first current remainder;
      calculating a second next remainder by subtracting another one of the stored multiples from the temporary remainder using the two cycle adder, wherein the other one of the stored multiples is selected based on the first current remainder;
      calculating an actual next quotient digit based on the estimated next quotient digit, the first current remainder and the first next remainder;
      updating the accumulated quotient with the actual next quotient digit; and
      setting the first current remainder to be equal to the first next remainder and the second current remainder to be equal to the second next remainder.

3. The system of claim 2 wherein the subset of the multiples include one, two, three, four, and five times the scaled divisor.

4. The system of claim 2 wherein the value of the other one of the stored multiples is based on the first two digits of the first current remainder if the estimated next quotient digit is equal to positive six, positive seven, positive eight, positive nine, negative six, negative seven, negative eight or negative nine and the value of the other one of the stored multiples is based on the first digit of the first current remainder otherwise.

5. The system of claim 2 wherein the scaled divisor is greater than or equal to one and less than one and one tenth.

6. The system of claim 2 wherein the calculating an actual next quotient digit includes:
   setting the actual next quotient digit to the estimated quotient digit if both the first current reminder and the first next remainder are larger than or equal to zero;
   setting the actual next quotient digit to one less than the estimated quotient digit if the first current remainder is larger than or equal to zero and if the first next remainder is less than zero;
   setting the actual next quotient digit to nine minus an absolute value of the estimated quotient digit if the first current remainder and the first next remainder are less than zero; and
   setting the actual next quotient digit to ten minus an absolute value of the estimated quotient digit if the first current remainder is less than zero and the first next remainder is greater than or equal to zero.

7. The system of claim 2 wherein the updating the accumulated quotient with the actual next quotient digit includes shifting the accumulated quotient one digit to the left and inserting the actual next quotient digit into the least significant digit of the accumulated quotient.

8. The system of claim 2 wherein the calculating an actual next quotient digit is performed every three clock cycles.

9. A system for performing decimal division, the system comprising:
   input registers for storing a scaled divisor and a scaled dividend;
   a plurality of multiples registers for storing a subset of multiples of the scaled divisor; and
   a pipeline mechanism including a two cycle adder, a latching multiplexer connected to the multiples registers and the two cycle adder, a remainder register connected to the two cycle adder, remainder selection circuitry connected to the remainder register, quotient selection circuitry connected to the multiplexer, the remainder selection circuitry and the remainder register, and a quotient accumulator connected to the two cycle adder, the pipeline mechanism:

calculating quotient digits in response to the scaled divisor and the scaled dividend, the calculating including:

selecting a new quotient digit; and calculating a new remainder using the two cycle adder, wherein input to the two cycle adder includes data from one or more of the multiples registers.

* * * * *